(12) United States Patent
Saman, Jr. et al.

(10) Patent No.: US 6,433,505 B2
(45) Date of Patent: *Aug. 13, 2002

(54) PHASE SHIFTING NETWORK

(76) Inventors: Michael Saman, Jr., 90 Tuttle Rd., Bristol, CT (US) 06010-7173; Richard S. Lenzing, 35 Garden St., Farmington, CT (US) 06032; Willis Dudley, Jr., 157 Elam St., New Britain, CT (US) 06053

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,837

(22) Filed: Sep. 25, 1998

(51) Int. Cl.[7] .................................. H02P 1/44
(52) U.S. Cl. ........................... 318/751; 318/781
(58) Field of Search ................... 318/751, 752, 318/755–756, 781, 782, 785, 786

(56) References Cited

U.S. PATENT DOCUMENTS

| | | | | |
|---|---|---|---|---|
| 2,242,343 A | * | 5/1941 | Buchanan | 172/278 |
| 2,406,193 A | * | 8/1946 | Carson | |
| 2,643,357 A | * | 6/1953 | Clark | |
| 3,453,516 A | * | 7/1969 | Conner | |
| 3,549,969 A | * | 12/1970 | Yoshimura | |
| 3,596,158 A | | 7/1971 | Watrous | 318/227 |
| 3,737,752 A | * | 6/1973 | Strachan | |
| 3,809,980 A | | 5/1974 | Nottingham, Jr. | 318/220 R |
| 3,999,108 A | * | 12/1976 | Tanikoshi | 318/138 |
| 4,013,937 A | | 3/1977 | Pelly et al. | 321/7 |
| 4,100,467 A | | 7/1978 | Charlton | 318/220 R |
| 4,107,584 A | | 8/1978 | Roger | 318/227 |
| 4,115,726 A | * | 9/1978 | Patterson et al. | 318/171 |
| 4,121,140 A | * | 10/1978 | Jones | 318/221 R |
| 4,128,791 A | | 12/1978 | Katz | 318/724 |
| 4,412,159 A | * | 10/1983 | Uzuka | 318/254 |
| 4,547,713 A | * | 10/1985 | Langley et al. | 318/254 |
| 4,642,494 A | * | 2/1987 | Lundin et al. | 310/49 R |
| 4,763,057 A | | 8/1988 | Danz et al. | 318/809 |
| 4,769,581 A | * | 9/1988 | Rilly | 318/254 |
| 4,780,652 A | * | 10/1988 | Rilly | 318/254 |
| 5,130,624 A | * | 7/1992 | Bashark | 318/280 |
| 5,166,568 A | * | 11/1992 | Nystuen et al. | 310/254 |
| 5,212,435 A | * | 5/1993 | Dutro | 318/785 |
| 5,252,904 A | * | 10/1993 | Nanos | 318/739 |
| 5,276,392 A | | 1/1994 | Beckerman | 318/751 |
| 5,321,342 A | * | 6/1994 | Kruse | 318/254 |
| 5,334,922 A | * | 8/1994 | Manini | 318/772 |
| 5,345,126 A | * | 9/1994 | Bunch | 310/68 |
| 5,404,088 A | * | 4/1995 | Nanos | 318/751 |
| 5,412,557 A | | 5/1995 | Lauw | 363/37 |
| 5,567,999 A | * | 10/1996 | Baronosky et al. | 310/194 |
| 5,710,493 A | * | 1/1998 | Flynn | 318/254 |
| 5,796,234 A | * | 8/1998 | Vrionis | 318/751 |

OTHER PUBLICATIONS

Catalog ACDC496, "Superior Slo-Syn® DC Step Motors, Gearmotors, and AC Synchronous Motors" Dana Corporation, p. AC-3.

"Design Engineer's Guide to DC Stepping Motors", Dana Corporation, p. 5 (1992).

* cited by examiner

*Primary Examiner*—Bentsu Ro
(74) *Attorney, Agent, or Firm*—Greer, Burns & Crain, Ltd.

(57) ABSTRACT

A phase shifting network for an inductor motor is provided. The network includes a resistor connected in series with each motor phase coil of a pair of motor phases. The network further includes a capacitor connected between the motor phases. The inventive phase shifting network produces current and voltage waveforms within the motor phase coils that are smoother, more equal, and less subject to harmonic distortion as compared to the waveforms generated by conventional phase shifting networks.

3 Claims, 5 Drawing Sheets

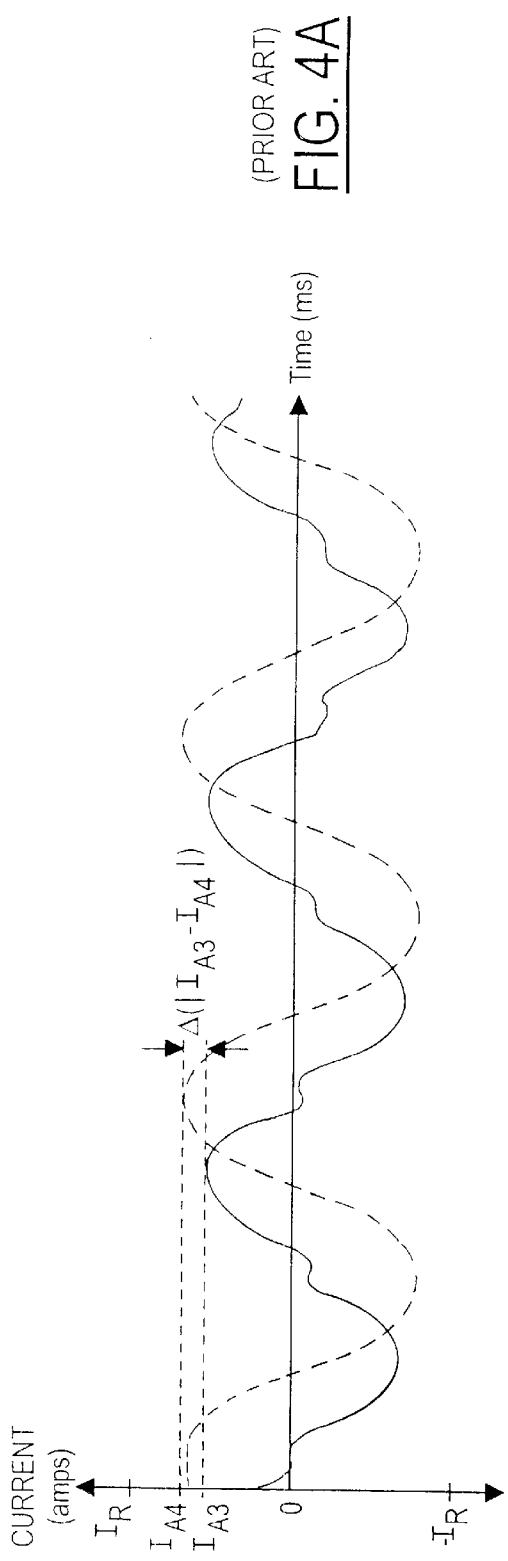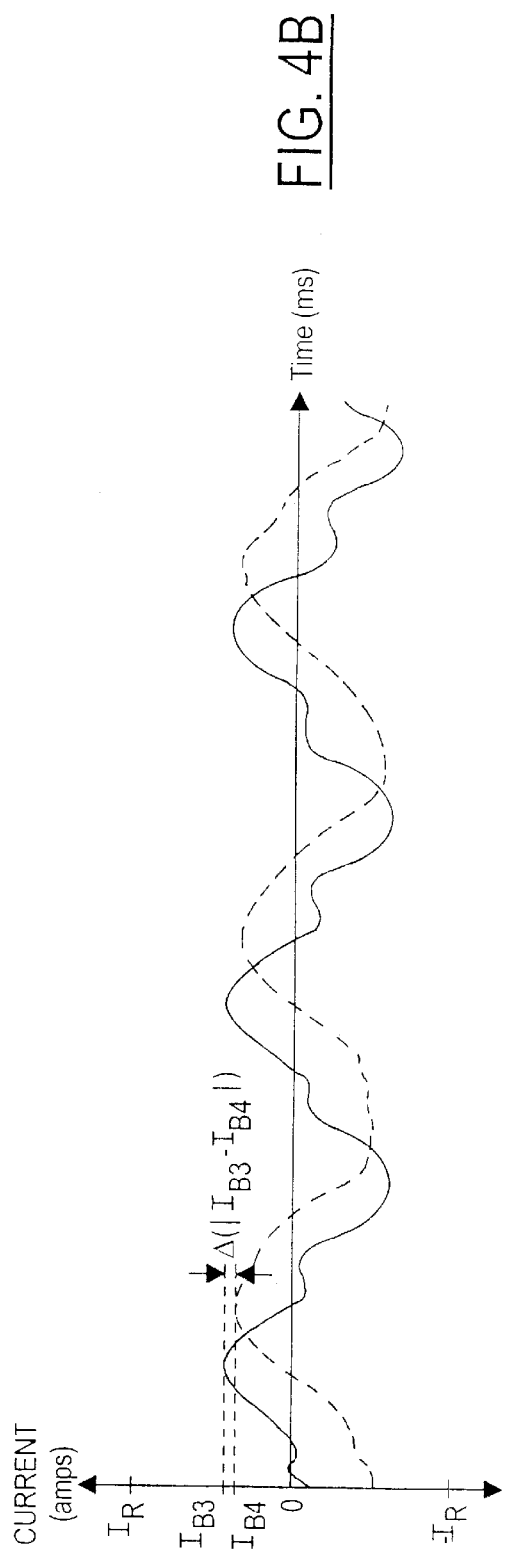

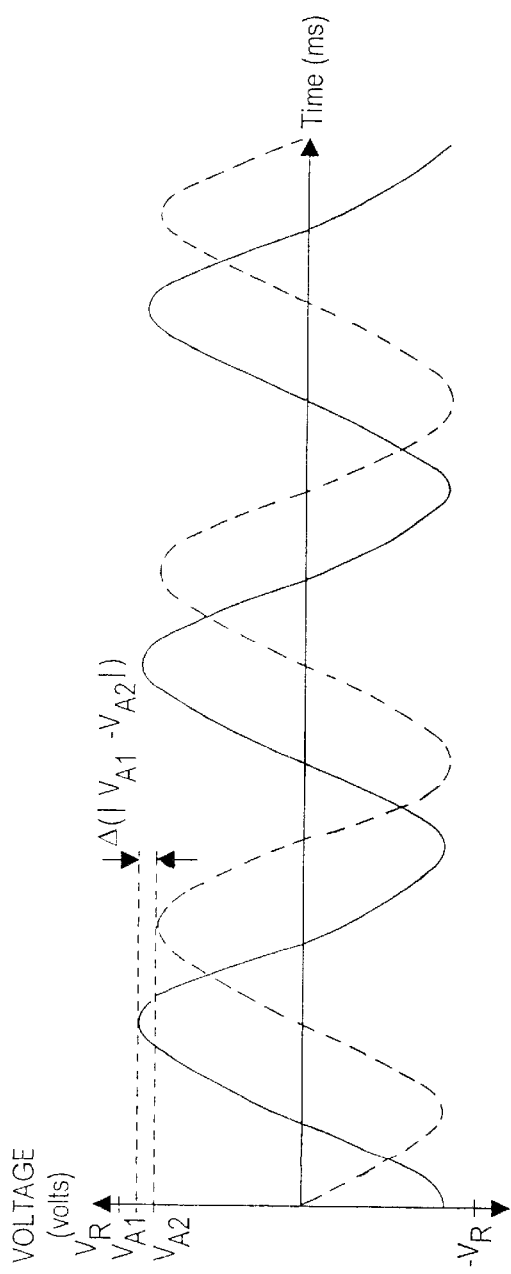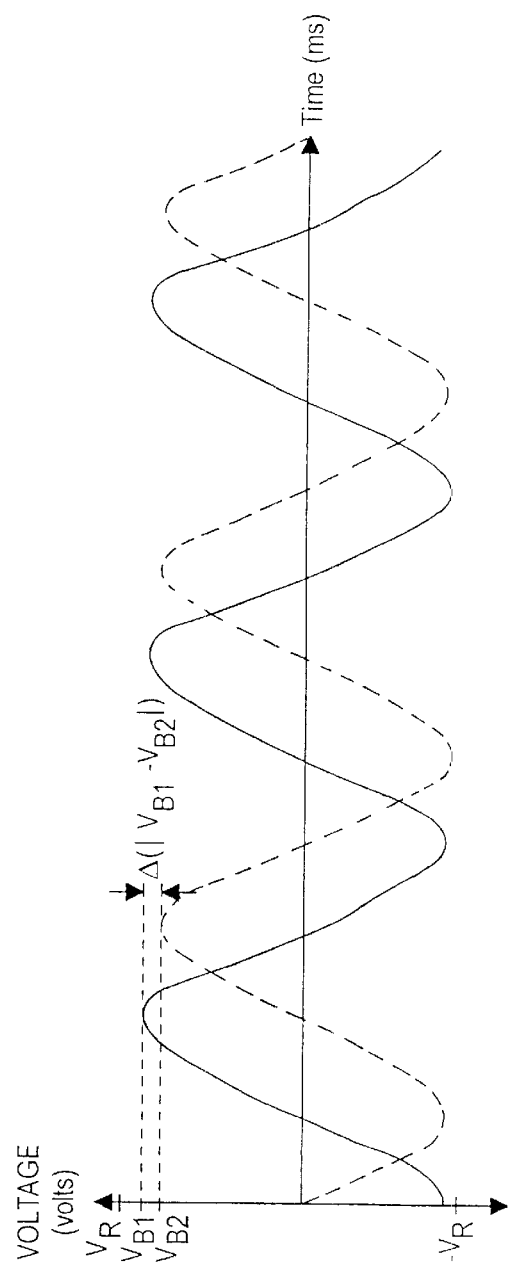

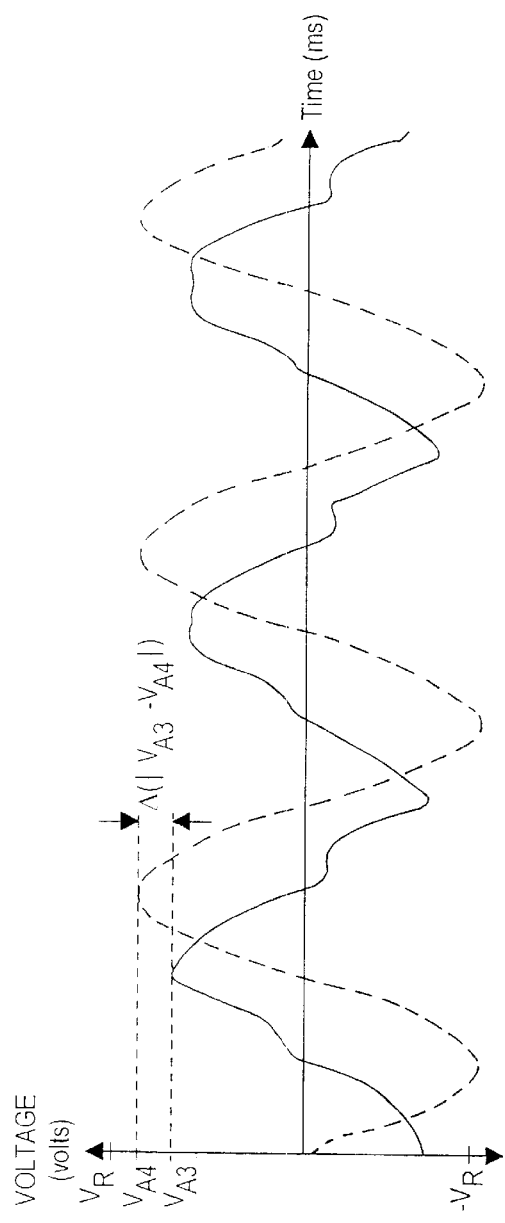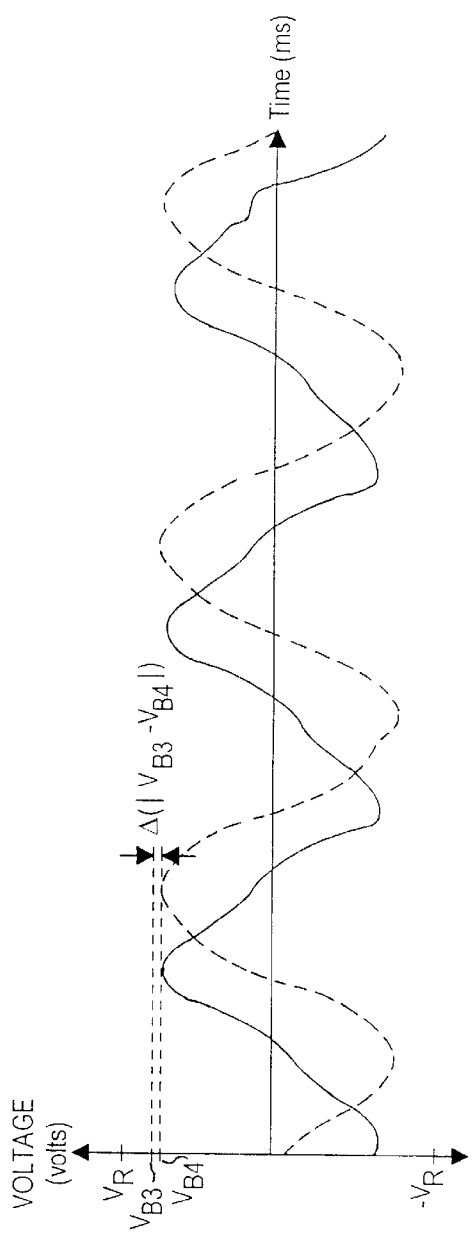

PHASE SHIFTING NETWORK

BACKGROUND OF THE INVENTION

1. Field of the Invention

This invention relates to a control circuit for an inductor motor and, in particular, to a control circuit that functions as a phase shifting network and enables a motor to run more smoothly by producing current and voltage waveforms within the respective motor phases that are smoother, more equal and less subject to harmonic distortion.

2. Disclosure of Related Art

A conventional control circuit 10 for use as a phase shifting network in a two-phase inductor motor is shown in FIG. 2A. Circuit 10 includes a resistor 12 and a capacitor 14 connected in series between a pair of motor phases 16, 18. Each of motor phases 16, 18 includes a motor phase coil 20, 22, respectively. A directional switching device 24 is used to control the sequence of energization of phase coils 20, 22. FIGS. 3A–6A illustrate the various current and voltage waveforms present in motor phases 16, 18 during operation of a motor incorporating circuit 10. In particular, FIGS. 3A and 5A illustrate current and voltage waveforms, respectively, present in motor phases 16, 18 during normal operation of the motor. FIGS. 4A and 6A illustrate current and voltage waveforms, respectively, present in motor phases 16, 18 as a breakdown in motor torque is about to occur. The current and voltage waveforms for phase 16 of circuit 10 are shown in a solid line while the current and voltage waveforms for phase 18 of circuit 10 are shown in broken line. It should be noted that FIGS. 3A–6A illustrate energization of phases 16, 18 in the sequence 16–>18 (i.e., with the current and voltage waveforms of phase 18 phase-shifted relative to phase 16). As illustrated in FIGS. 3A–6A, the current and voltage waveforms within each individual phase 16, 18 of circuit 10 are subject to relatively large variations in magnitude. Moreover, the magnitude of the current and voltage within phase 16 varies significantly from the magnitude of the current and voltage, respectively, within phase 18. Finally, the voltage in phases 16, 18 is at times subject to a relatively large amount of harmonic distortion as shown in FIG. 6A. These deficiencies result in torque pulses within a motor incorporating circuit 10, thereby causing the velocity of the motor to modulate and the motor to run rough.

There is thus a need for a control circuit for a motor that will minimize or eliminate one or more of the above-mentioned deficiencies.

SUMMARY OF THE INVENTION

The present invention provides a control circuit for use as a phase shifting network in a motor such as an inductor motor.

An object of the present invention is to provide a control circuit for a motor that will reduce velocity modulation in the motor and thereby enable smoother operation of the motor.

Related objects of the present invention are to provide a control circuit for a motor that will produce current and voltage waveforms within the motor phases that are smoother, more equal, and less subject to harmonic distortion as compared to the current and voltage waveforms generated by conventional control circuits.

A control circuit for a motor in accordance with the present invention includes a first motor phase having a first resistor connected in series with a first phase coil of the motor. The circuit further includes a second motor phase having a second resistor connected in series with a second phase coil of the motor. Finally, the circuit includes a capacitor connected between the first and second motor phases.

A control circuit in accordance with the present invention smooths the current and voltage waveforms within the motor phase coils by reducing the non-linear characteristics of the motor. First, the control circuit reduces the maximum operating voltage of the motor thereby preventing the magnetic structure of the motor from saturating. Second, the addition of linear impedance devices such as resistors in series with each phase coil makes the motor more linear than the motor alone. A control circuit in accordance with the present invention also equalizes the magnitude of the current in the motor phases coils—thereby producing a smoother running motor—by equalizing the circuit impedance between the phases of the motor. In a conventional phase shifting network such as circuit 10 in FIG. 2A, the impedance between phases 16, 18 differs by the impedance of a resistor 12 and a capacitor 14. In the inventive control circuit, the difference in impedance between the phases is limited to the impedance of the capacitor (because both phases include a resistor).

The inventive control circuit has several additional advantages as compared to conventional control circuits. First, the inventive circuit results in a lower operating voltage for the motor, thereby allowing the use of wire of various diameters within the motor phases. The use of larger diameter wire can be advantageous because larger diameter wire is easier to wind and to terminate. Second, the inventive circuit enables the motor to run cooler for a given supply voltage as compared to conventional circuits. Finally, the inventive circuit enables a motor to start loads having a larger inertia as compared to conventional circuits.

These and other features and objects of this invention will become apparent to one skilled in the art from the following detailed description and the accompanying drawings illustrating features of this invention by way of example.

BRIEF DESCRIPTION OF THE DRAWINGS

FIG. 4A is a waveform diagram illustrating the current waveforms in the respective motor phases of a motor incorporating the circuit of FIG. 2A during torque breakdown.

FIG. 4B is a waveform diagram illustrating the current waveforms in the respective motor phases of a motor incorporating the circuit of FIG. 2B during torque breakdown FIG. 5A is a waveform diagram illustrating the voltage waveforms in the respective motor phases of a motor incorporating the circuit of FIG. 2A during normal operation.

FIG. 5B is a waveform diagram illustrating the voltage waveforms in the respective motor phases of a motor incorporating the circuit of FIG. 2B during normal operation.

FIG. 6A is a waveform diagram illustrating the voltage waveforms in the respective motor phases of a motor incorporating the circuit of FIG. 2A during torque breakdown.

FIG. 6B is a waveform diagram illustrating the voltage waveforms in the respective motor phases of a motor incorporating the circuit of FIG. 2B during torque breakdown.

DETAILED DESCRIPTION OF THE PREFERRED EMBODIMENT

Figure 1:
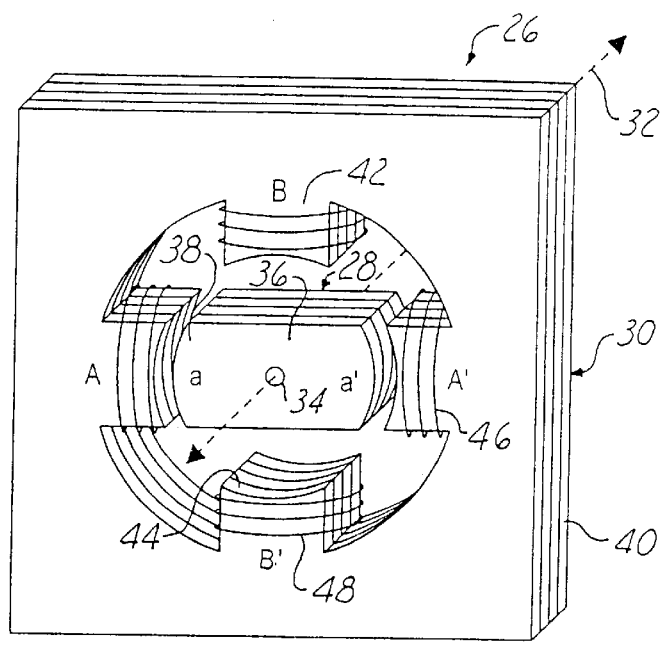
FIG. 1 is a perspective view of an inductor motor.

Referring now to the drawings wherein like reference numerals are used to identify identical components in the various views, FIG. 1 illustrates a typical inductor motor 26. Although the illustrated motor comprises a two-phase inductor motor, it should be understood that the invention as disclosed herein could be applied to other motors as is known in the art. Motor 26 includes a rotor assembly 28 and a stator assembly 30, both of which may be centered about an axis 32.

Rotor assembly 28 is provided to move a load (not shown) connected to rotor assembly 28. Assembly 28 includes a shaft 34 and a rotor 36 disposed about shaft 34. Shaft 34 is provided to engage either the load or another means for engaging the load. Shaft 34 extends longitudinally along axis 32 and may be centered about axis 32. Rotor 36 is provided to impart rotation to shaft 34 and is capable of clockwise or counterclockwise rotation. Rotor 36 may be comprised of a plurality of laminations of a material having relatively low magnetic reluctance, such as iron. Rotor 36 may be centered about axis 32 and may include a spline or key (not shown) configured to be inserted within a keyway (not shown) in shaft 34. Rotor 36 includes a plurality of radially outwardly extending rotor poles 38 configured as a diametrically opposed rotor pole pair a–a'. Each of poles 38 is generally rectangular in cross-section and may include one or more radially outwardly extending teeth as is known in the art. It will be understood by those skilled in the art that the number of poles 38 of rotor 36 may vary.

Stator assembly 30 is provided to produce a torque to cause rotation of rotor assembly 28. Stator assembly 30 may comprise a plurality of laminations 40 that are formed from a material, such as iron, having a relatively low magnetic reluctance. Assembly 30 includes a plurality of radially inwardly extending poles 42 configured as diametrically opposed stator pole pairs A–A', B–B'. Each pair of stator poles 42 is provided to attract a corresponding pair of rotor poles 38 of rotor assembly 28 and thereby cause rotation of rotor assembly 28. Poles 42 are generally rectangular in cross-section and may include one or more radially inwardly extending teeth (not shown) as is known in the art. Poles 42 may extend along the axial length of stator assembly 30 and define a bore 44 that is adapted to receive rotor assembly 28. It will be understood by those skilled in the art that the number of stator poles 42 may vary.

Rotation of rotor assembly 28 is produced by energizing phase coils 46, 48 surrounding each stator pole pair. Phase coils 46, 48 are formed by connecting, in series or in parallel, windings on diametrically opposed stator poles 42. As one of phase coils 46, 48 begins to conduct current, the nearest rotor pole pair is magnetically attracted toward the stator pole pair around which the energized phase coil is wound.

Figure 2A:
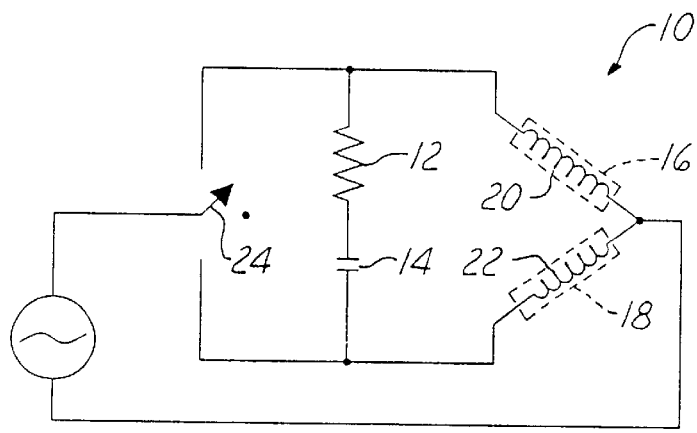
FIG. 2A is a schematic diagram of a conventional control circuit for use as a phase shifting network.
Figure 2B:
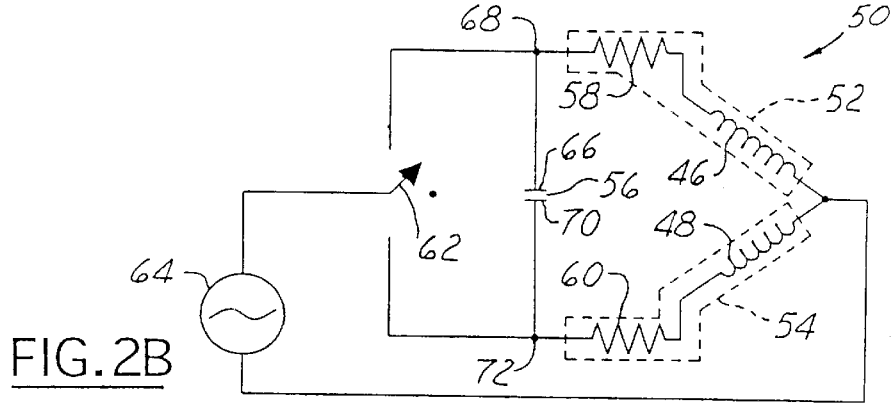
FIG. 2B is a schematic diagram of a control circuit for use as a phase shifting network in accordance with the present invention.

Referring now to FIG. 2B, a control circuit 50 in accordance with the present invention is provided. Circuit 50 includes a pair of motor phases 52, 54. Each motor phase 52, 54 includes a phase coil 46, 48. Circuit 50 further includes means, such as capacitor 56 and resistors 58, 60, respectively, for controlling a first phase current in phase coil 46 and a second phase current in phase coil 48. Circuit 50 may further include means, such as directional switching device 62, for selectively energizing phase coils 46, 48 in a plurality of phase sequences to thereby change the direction of motor 26.

Capacitor 56 is provided to generate a phase shift in the voltage and current supplied to one of phase coils 46, 48 by a single-phase power source 64. Capacitor 56 is conventional in the art. Capacitor 56 is connected between motor phases 52, 54, having a first plate 66 connected to a node 68 and a second plate 70 connected to a node 72.

Resistors 58, 60 are provided to reduce velocity modulation within motor 26 by smoothing the current and voltage waveforms within motor phases 52, 54, equalizing the velocity and current magnitudes in the respective motor phases 52, 54, and reducing harmonic distortion of the voltage waveforms within motor phases 52, 54. Resistor 58 is connected in series with phase coil 46, having a first end connected to plate 66 of capacitor 56 at node 70 and a second end connected to phase coil 46. Resistor 60 is connected in series with phase coil 48, having a first end connected to plate 70 of capacitor 56 at node 72 and a second end connected to phase coil 48.

Directional switching device 62 is provided to enable energization of phase coils 46, 48 in multiple sequences so that rotor assembly 28 can be made to rotate in either a clockwise or counterclockwise direction. Switching device 62 is conventional in the art.

Referring now to FIGS. 3A–6A and 3B–6B, the operative effect of a control circuit 50 in accordance with the present invention will be described. FIGS. 3A–6A illustrate current and voltage waveforms in a motor incorporating conventional control circuit 10. The current and voltage waveforms in motor phase 16 are shown in solid line while the current and voltage waveforms in motor phase 18 are shown in broken line. FIGS. 3B–6B illustrate current and voltage waveforms in a motor 26 incorporating inventive circuit 50. The current and voltage waveforms in motor phase 52 are shown in solid line while the current and voltage waveforms in motor phase 54 are shown in broken line. Although the waveforms assume a sequence of energization of 16–>18 in circuit 10 and 52–>54 in circuit 50, it should be understood that the sequence of energization may vary.

Figure 3A:
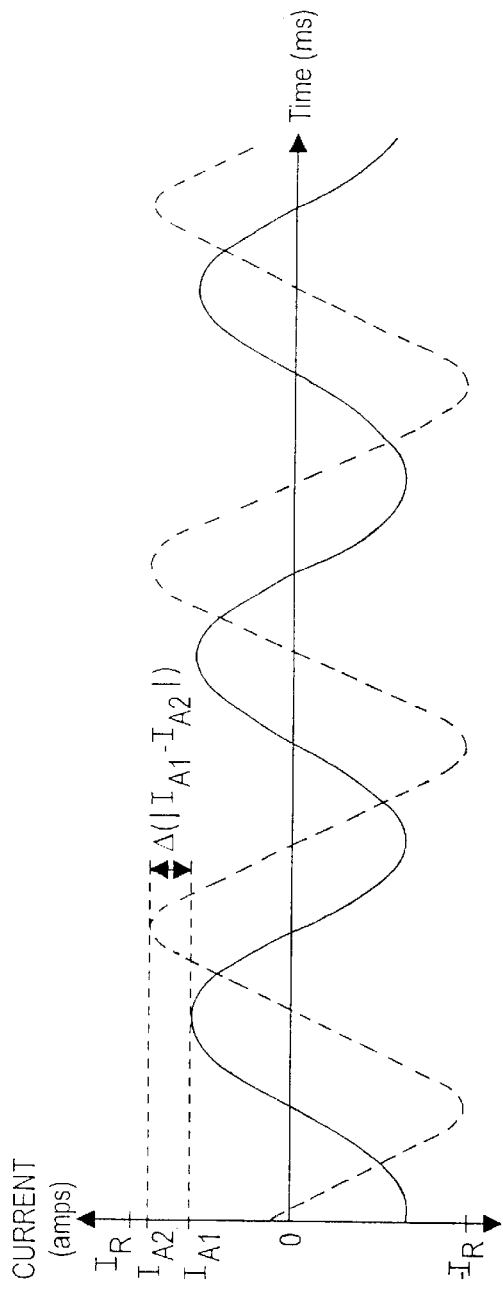
FIG. 3A is a waveform diagram illustrating the current waveforms in the respective motor phases of a motor incorporating the circuit of FIG. 2A during normal operation.
Figure 3B:
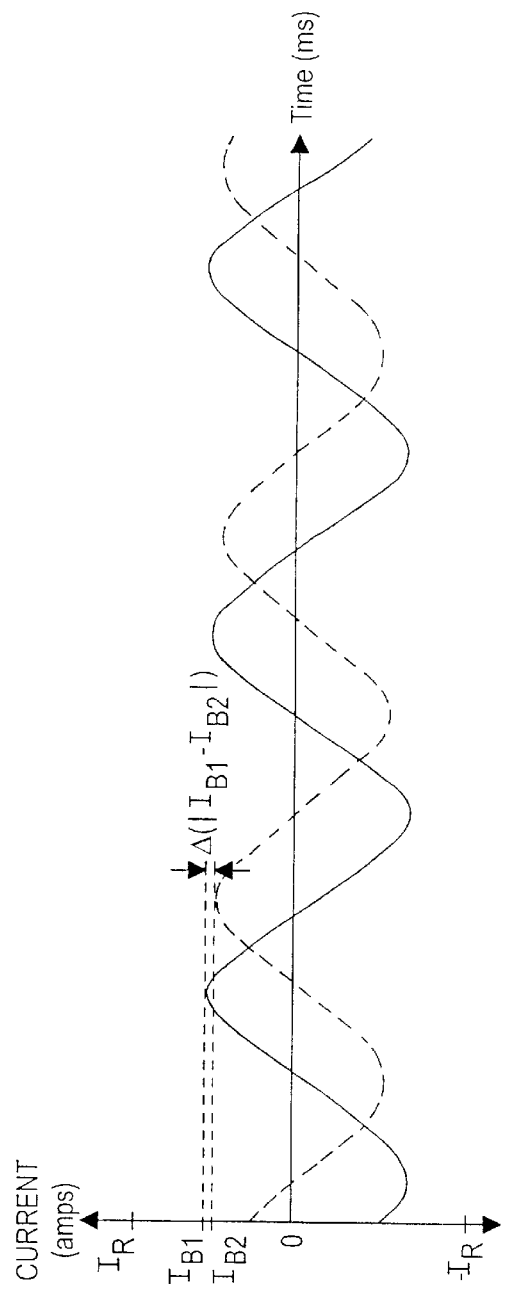
FIG. 3B is a waveform diagram illustrating the current waveforms in the respective motor phases of a motor incorporating the circuit of FIG. 2B during normal operation.

As shown in FIGS. 3A, during normal operation of a motor incorporating conventional control circuit 10, the currents in phase coils 20, 22 reach magnitudes of $I_{A1}$ and $I_{A2}$ amperes, respectively. The difference in peak current magnitudes between phases 16, 18 is therefore $\Delta(|I_{A1}-I_{A2}|)$. Referring now to FIG. 3B, during normal operation of a motor 26 incorporating a control circuit 50 in accordance with the present invention, the currents in phase coils 46, 48 reach magnitudes of $I_{B1}$ and $I_{B2}$ amperes, respectively. $I_{B1}$ and $I_{B2}$ are less than $I_{A1}$ and $I_{A2}$, respectively. As a result, the current waveforms in phases 52, 54 of circuit 50 are smoother than the current waveforms in phases 16, 18 of conventional circuit 10. More importantly, the difference in peak current magnitudes between phases 52, 54, $\Delta(|I_{B1}-I_{B2}|)$, is less than $\Delta(|I_{A1}-I_{A2}|)$. Because the peak current magnitudes in phases 52, 54 are more equal, there is less velocity modulation within motor 26.

The same results are achieved as the motor approaches a breakdown in motor torque. Referring to FIG. 4A, in a motor incorporating conventional control circuit 10, the currents in phase coils 20, 22 reach magnitudes of $I_{A3}$ and $I_{A4}$ amperes, respectively. The difference in peak current magnitudes between phases 16, 18 is therefore $\Delta(|I_{A3}-I_{A4}|)$. Referring now to FIG. 4B, in a motor 26 incorporating a control circuit 50 in accordance with the present invention, the currents in phase coils 46, 48 reach magnitudes of $I_{B3}$ and $I_{B4}$ amperes, respectively. $I_{B3}$ and $I_{B4}$ are less than $I_{A3}$ and $I_{A4}$, respectively. As a result, the current waveforms in phases 52, 54 of circuit 50 are smoother than the current waveforms in phases 16, 18 of conventional circuit 10. More importantly, the difference in peak current magnitudes between phases 52, 54, $\Delta(|I_{B3}-I_{B4}|)$, is less than $\Delta(|I_{A3}-I_{A4}|)$. Because the peak current magnitudes in phases 52, 54 are more equal, there is again less velocity modulation within motor 26.

Referring now to FIGS. 5A and 5B, during normal operation of motors incorporating conventional control circuit 10 (FIG. 5A) and inventive circuit 50 (FIG. 5B) the voltage waveforms within phases 16, 18 of circuit 10 and phases 52, 54 of circuit 50 are substantially equivalent. However, as the motors approaches torque breakdown, the voltage waveforms differ as shown in FIGS. 6A and 6B. Referring to FIG. 6A, in a motor incorporating conventional control circuit 10, the voltages in phases 16, 18 reach magnitudes of VA3 and $VA_4$ volts, respectively. The difference in peak voltage magnitudes between phases 16, 18 is therefore $\Delta(|V_{A3}-V_{A4}|)$. Referring now to FIG. 6B, in a motor 26 incorporating a control circuit 50 in accordance with the present invention, the voltages in phases 52, 54 reach magnitudes of $V_{B3}$ and $V_{B4}$ volts, respectively. $V_{B3}$ and $V_{B4}$ are less than $V_{A3}$ and $V_{A4}$, respectively. As a result, the voltage waveforms in phases 52, 54 of circuit 50 are smoother than the voltage waveforms in phases 16, 18 of conventional circuit 10. More importantly, the difference in peak voltage magnitudes between phases 52, 54, $\Delta(|V_{B3}-V_{B4}|)$, is less than $\Delta(|V_{A3}-V_{A4}|)$. Because the peak voltage magnitudes in phases 52, 54 are more equal, there is again less velocity modulation within motor 26. Finally, the voltage waveforms in phases 52, 54 of circuit 50 do not suffer from the same level of harmonic distortion as the voltage waveforms in phases 16, 18 of circuit 10 as illustrated in FIGS. 6A and 6B.

A control circuit 50 in accordance with the present invention provides smoother and more equal current and voltage waveforms within the motor phases 52, 54 to thereby reduce velocity modulation within motor 26. Circuit 50 smoothes the current and voltage waveforms by reducing the non-linear characteristics of motor 26. First, control circuit 50 reduces the maximum operating voltage of motor 26 thereby preventing the magnetic structure of motor 26 from saturating. Second, the addition of resistors 58, 60 increases the linear impedance of motor 26. Circuit 50 equalizes the magnitude of the current in the motor phases coils 46, 48— thereby producing a smoother running motor 26—by equalizing the circuit impedance between motor phases 52, 54. As mentioned hereinabove, in a conventional phase shifting network such as circuit 10 in FIG. 2A, the impedance between the phases 16, 18 differs by the impedance of a resistor 12 and a capacitor 14. In circuit 50, the difference in impedance between phases 52, 54 is limited to the impedance of capacitor 56 (because both phases 52, 54 include resistors 58, 60).

While the invention has been particularly shown and described with reference to the preferred embodiments thereof, it is well understood by those skilled in the art that various changes and modifications can be made in the invention without departing from the spirit and scope of the invention.

We claim:

1. An apparatus comprising:
    an inductor motor including a stator having first and second pairs of diametrically opposed stator poles and a rotor disposed within said stator; and, a control circuit including,
        a first motor phase having a first phase coil disposed about said first stator pole pair, and a first resistor having a first end connected to said first phase coil and a second end connected to a first node,
        a second motor phase having a second phase coil disposed about said second stator pole pair, and a second resistor having a first end connected to said second phase coil and a second end connected to a second node;
    a capacitor connected between said first and second nodes; and
    a power source for selectively energizing said first phase coil to generate a first phase current and said second phase coil to generate a second phase current;
    wherein a magnitude of said first phase current is substantially equal to a magnitude of said second phase current.

2. The apparatus of claim 1 wherein said first and second phase coils are selectively energized by a single-phase power source and said first phase current in said first phase coils is phase-shifted relative to said second phase current in said second phase coil.

3. The apparatus of claim 1, further comprising means for selectively energizing said first and second phase coils in a plurality of phase sequences.

* * * * *